March 1, 1966   J. C. WHITTINGHAM   3,237,879
INERTIA LOCKING REEL
Filed Oct. 4, 1963
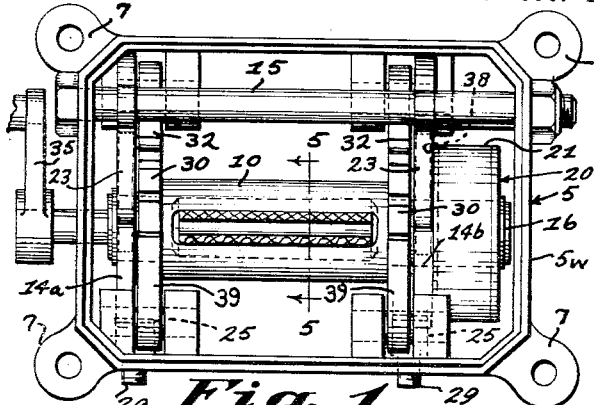
Fig. 1
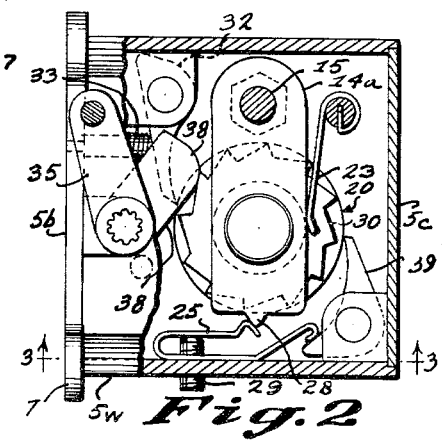
Fig. 2
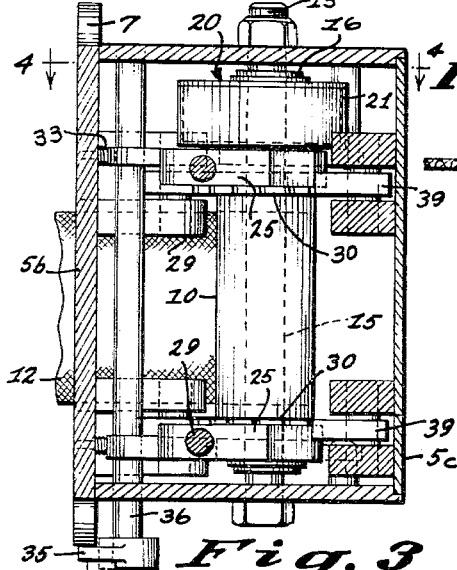
Fig. 3
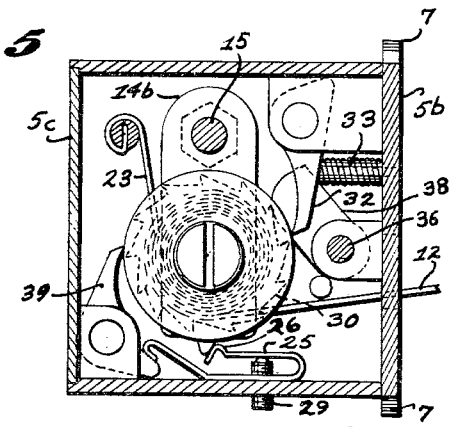
Fig. 4
Fig. 5
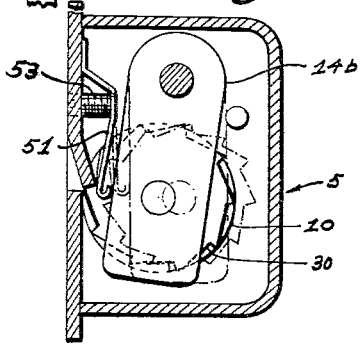
Fig. 6
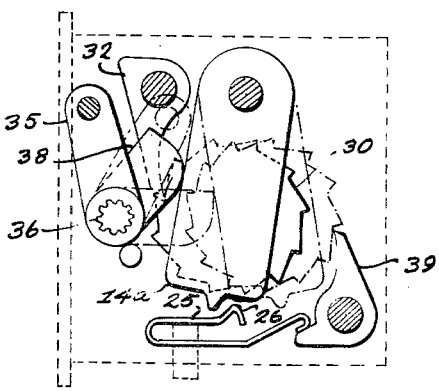
Fig. 7
INVENTOR.
BY JOHN C. WHITTINGHAM
Anderson, Spangler & Wymore
ATTORNEY

United States Patent Office 3,237,879
Patented Mar. 1, 1966

3,237,879
INERTIA LOCKING REEL
John C. Whittingham, Colorado Springs, Colo., assignor to Aircraft Mechanics, Inc., a corporation of Colorado
Filed Oct. 4, 1963, Ser. No. 313,913
8 Claims. (Cl. 242—107.4)

The present invention relates generally to safety harness apparatus and more specifically to an inertia operated locking reel mechanism for storing a portion of the safety harness.

Lap belts, shoulder straps and other forms of safety harness have long been used in aircraft to maintain the occupants in their seats under conditions of extreme decceleration or abnormal attitude of the aircraft. Initially, the occupant was securely fastened into the seat by a close fitting harness which accomplished the intended purpose but at the same time severely restricted his freedom of movement. This problem was alleviated to a great extent by the use of the so-called "locking reel" or "inertia reel" as it is often called because of its principal of operation. These reels are familiar to those versed in the art of aircraft seating and it is well known that such a reel functions to wind up and store a portion of the safety harness and pay it out under tension to allow greater freedom of movement of the seat occupant. However, under certain conditions of decceleration the reel "locks" and further unwinding of the stored harness is not permitted, thus maintaining the seat occupant in his most forward or out-of-seat position.

A great variety of such reels have been developed, however, they have been attended for the most part with complexity and great expense in order to satisfy the rigid requirements of military applications.

It is therefore the primary object of the present invention to provide a locking reel of the type described which is simple in its operation and construction and is inexpensive to produce.

A second object of the invention is to provide a locking reel mechanism which will lend itself to use in automobiles and small private aircraft.

Another object of the invention is to provide a belt storing reel mechanism which will allow the stored belt to be unwound from the reel until such time as a given acceleration of belt pay off occurs, at which time the reel is locked against further unwinding rotation.

Other and further objects, features, and advantages of the present invention will become apparent as the following detailed description of a preferred form of the invention is read in connection with the accompanying drawings in which:

FIGURE 1 is a rear elevational view of the locking reel mechanism with the housing cover removed to illustrate the interior portions thereof.

FIGURE 2 is a side elevational view of the mechanism with a portion of the side wall broken away and shown in section.

FIGURE 3 is a cross sectional view taken along lines 3—3 in FIGURE 2.

FIGURE 4 is a cross sectional view taken along lines 4—4 in FIGURE 3.

FIGURE 5 is a cross sectional view of the spool and belting taken along lines 5—5 in FIGURE 1.

FIGURE 6 is a side elevational view with the housing broken away and shown in cross section of a simplified embodiment of the mechanism.

FIGURE 7 is a functional side elevational view of the moving parts of the mechanism illustrating two extreme positions of the belt spool and attached ratchet gears, the one position being shown in full lines, the other position being shown in broken lines.

Referring now to the drawings, the locking reel mechanism of the present invention is illustrated in the various figures as being enclosed in a housing 5 which is equipped on its four corners with protruding bolt receiving ears 7 to provide means for fastening the mechanism to the back of the vehicle seat, floor, or other convenient structural member. The housing 5 is made up of a base plate 5b, with which the ears 7 are integrally formed, upstanding side walls 5w which are attached to the base 5b and a top cover member 5c. Within the housing 5 is a revolvable spool 10 whose rotational axis is parallel to the base plate 5b and which spool anchors one end of a safety belt member 12 which is adapted to be wound up on the spool 10 for storage. The belt spool 10 is supported for rotation by a pair of opposed pivotally mounted hangers 14a and 14b supported by a transverse cross bar 15. Each end of the belt spool 10 is of reduced diameter for insertion in the aligned bearing apertures in the lower extremities of the respective hangers 14a and 14b. One reduced diameter end 16 of the spool 10 extends beyond the bearing hanger 14b by which it is supported and carries a spirally wound spring motor 20 whose inner end is secured to the said end 16 of the spool 10 and whose outer end and housing member 21 is rigidly attached to the hanger 14b. Thus, in a manner well known to the art, the spring motor is wound up as the belt 12 is pulled from or reeled off the spool 10 so as to provide spring power for rewinding the belt onto the spool once the tension or belt pulling force is removed.

It will be noted that as the belt 12 is payed off of the spool 10 a certain moment arm of force is present tending to pivot the spool 10 about the pivotal axis formed by the transverse cross bar 15. The spool 10 and bearing hangers 14a and 14b are held in position however by the forward bearing pressure of a pair of leaf springs 23, in contact with the respective rearward edges of the two hangers 14a and 14b, and the opposing force of a second pair of leaf springs 25 also in contact with the respective hangers. The latter mentioned springs 25 are each horizontally disposed beneath the main portion of the respective hangers and a raised detent 26 in the end of each spring remains in abutting engagement with a downwardly extending center line protrusion 28 on the hanger tips to prevent the protrusion from moving forward beyond the detent under normal conditions. A force moment may be exerted on the spool by a strong outward pull on the belt 12 sufficient to cause the hanger protrusion to depress the spring detents 26 and allow the hangers and spool to pivot forwardly, as shown by the solid line view of the hanger 14a in FIGURE 7. The force of pull required to cause the spring detents 26 to be depressed can be adjusted by set screws 29 which may be brought to bear upwardly against the leaf spring 25. As the spool pivots forwardly about its pivotal axis, bar 15, each one of a pair of ratchet gears 30 which are carried by the reduced diameter portions of the spool 10 are respectively engaged by a first pair of ratchet pawls 32 mounted on the housing members 5w and 5b. The ratchet pawls 32, by their contact with the ratchet gears 30, prevent further rotation of the spool 10 in the direction to further unwind any belt 12, but, by the ratchet design of the gears 30, the spool is free to be rotated by the spring motor 20 and wind up the belting 12. The first ratchet pawls 32 are held against the ratchet gears by a pair of abutting biasing springs 33 while at the same time the spool and hangers are urged forward by the pressure of the aforementioned leaf springs 23 which contact the hangers 14a and 14b.

Once the purpose of the mechanism has been accomplished by resisting further paying out of the safety belt 12, the seat occupant may return the mechanism to its normal position by merely moving the external crank arm 35 so that the coupled shaft 36 will rotate to move a pair of levers 38 against the forward edges of the respective hangers 14a and 14b and force the hangers back over the depressable spring detents 26 to the normal position.

For some purposes it may be expedient to establish a given length of belting pay off and manually lock the reel against further unwinding without relying on the automatic locking which takes place upon acceleration of the belt pay off, as just described. A pair of manual locking pawls 39 are mounted on the housing 5 for engagement with the ratchet gears 30 when the spool 10 and gears 30 are pivoted rearwardly against the pressure of the hanger biasing leaf springs 23. As seen in phantom view in FIGURE 7, the hanger contacting levers 38 may be manually rotated by the crank arm 35 to the point where they are horizontally positioned and thereby force the hangers and spool 10 rearwardly so that the ratchet gears 30 are both engaged by the "manual" locking pawls 39. In the embodiment shown and illustrated the "manual" lock condition will be continually held by the levers 38 being moved to the dotted line position and maintained against the force of the biasing springs 23 until the levers are returned to the solid line position by the seat occupant, however, additional means for latching the mechanism in the so-called "manual" lock position could be provided by one skilled in the art without departing from the scope of the invention.

A second and simplified embodiment of the invention appears in FIGURE 6 of the drawings. This embodiment comprises the same sub-combination of essential elements as the preferred form including the housing 5, hangers 14a and 14b, spool 10 and ratchet gears 30. The manual lock and manual reset features of the preferred form have been eliminated for economy's sake. A pair of reset springs 51 whose biasing forces are adjustably fixed by abutting set screws 53 keep the hangers 14a and 14b in a vertical position except under conditions of belt pay off acceleration which produce a force moment sufficient to move the reset springs 51 back to the position shown in solid lines in FIGURE 6. Upon reaching a certain forward pivotal position, the ratchet gears 30 engage a pawl formed by a strike-out in the housing wall and the ratchet gear is brought to a stop. When the forces producing the forward motion of the spool and ratchet have disappeared the rearward pressure of the reset springs 51 repositions the hangers 14a and 14b and spool 10 for normal take up and pay out of belting.

Having thus described the several useful and novel features of the inertia locking reel of the present invention in connection with the accompanying drawings, it will be seen that the many worthwhile objectives for which it was designed have been achieved. Although but two of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:
1. A safety harness locking device, comprising;
a housing;
a spool;
support means rotatably mounting said spool and pivotally attached to the housing;
at least one ratchet gear carried by said spool and rotatable therewith;
means carried by the housing and arranged in contact with the support means to normally maintain the support means in a fixed position relative to the housing;
at least one pawl member carried by the housing for pivotal movement and biased into position to lockingly engage the said ratchet gear in ratchet relation when the spool and gear are pivotally moved in one direction from the said normal position;
said contact means including means mounted on said housing biasing said support means for movement in said one direction to maintain said pawl member in locking engagement with said ratchet gear when the support means is moved from said normal position; and
a spring motor having an output operatively connected to the spool, said spring motor being so arranged with respect to the spool as to be wound up when the spool is rotated in a first direction and adapted to rotate the spool in the opposite direction and said ratchet gear in ratchet relaion wih said pawl member.

2. A reel mechanism, including;
a rotatable spool adapted for storing a length of material wound thereon;
means swingably mounting the rotatable spool about a pivot axis parallel to the axis of rotation of said spool;
retainer means bearing against said swingable mounting means and fixed with respect to said pivotal axis and adapted to retain the spool in a fixed angular position with respect to the pivotal axis;
gear means carried by the spool and rotatable therewith;
pawl means mounted for pivotal movement and positioned in a spaced apart relationship to the gear means relative to the said fixed angular position of the spool and spring biased to lockingly engage the gear means in ratchet relation upon pivotal movement of the spool from its said fixed angular position;
said retainer means including means biasing said means swingably mounting the spool for pivotal movement from its fixed angular position to maintain said pawl means in locking engagement with said gear means when the said means for swingably mounting the spool is pivotally moved in one direction from its said fixed angular position; and
a spring motor having an output operatively connected to the spool, said spring motor being so arranged with respect to the spool as to be wound up when the spool is rotated in a first direction and adapted to rotate the spool and said gear means in a rewind direction with said gear means being in ratchet relation with said pawl means.

3. A locking reel mechanism, comprising in combination;
a frame;
a rotatable spool;
an elongated web member having one end thereof secured to the spool and adapted to be wound up on said spool;
means movably mounting said rotatable spool onto said frame to permit migration of the spool away from a normal station in a direction normal to the axis of rotation of the spool;
deformable retainer means bearing against the movable mounting means to maintain the said spool in its normal station;
gear means carried by the spool and rotatable therewith;
pawl means mounted for pivotal movement and positioned in a spaced apart relationship to the gear means relative to the said fixed position of the spool and spring biased to lockingly engage the gear means in ratchet relation upon pivotal movement of the spool from its said fixed position;
said retainer means including means mounted on the frame biasing said movable spool support means in said direction away from said normal station to maintain said pawl means in locking engagement with said gear means when the said movable spool support means is moved in one direction from its said fixed angular position; and
a spring motor having an output operatively connected to the spool, said spring motor being so arranged with respect to the spool as to be wound up when the spool is rotated in a first direction and adapted to rotate the spool in a rewind direction and said gear means being in ratchet relation with said pawl means.

4. A safety harness locking device, comprising;
a housing;
a spool;
support means rotatably mounting said spool and pivotally attached to the housing;
at least one ratchet gear carried by said spool and rotatable therewith;
means carried by the housing and arranged in contact with the support means to normally maintain the support means in a fixed position relative to the housing;
at least one pawl member carried by the housing for pivotal movement and spring biased into position to lockingly engage the said ratchet gear when the spool and gear are pivotally moved in one direction from the said normal position;
said contact means including means mounted on said housing biasing said support means for movement in said one direction to maintain said pawl member in locking engagement with said ratchet gear when the support means is moved from said normal position; and
a spring motor having an output operatively connected to the spool, said spring motor being so arranged with respect to the spool as to be wound up when the spool is rotated in a first direction and adapted to rotate the spool in the opposite direction and said ratchet gear being in ratchet relation with said pawl member.

5. A reel mechanism, including;
a rotatable spool adapted for storing a length of material wound thereon;
means swingably mounting the rotatable spool about a pivot axis parallel to the axis of rotation of said spool;
retainer means bearing against said swingable mounting means and fixed with respect to said pivotal axis and adapted to retain the spool in a fixed angular position with respect to the pivotal axis;
gear means carried by the spool and rotatable therewith;
pawl means mounted for pivotal movement and positioned in a spaced apart relationship to the gear means relative to the said fixed angular position of the spool and spring biased to lockingly engage the gear means in ratchet relation upon pivotal movement of the spool from its said fixed angular position;
said retainer means including means biasing said means swingably mounting the spool for pivotal movement from its fixed angular position to maintain said pawl means in locking engagement with said gear means when the said means for swingably mounting the spool is moved in one direction from its said fixed angular position; and
a spring motor having an output operatively connected to the spool, said spring motor being so arranged with respect to the spool as to be wound up when the spool is rotated in one direction and adapted to rotate the spool and said gear means in a rewind direction with said gear means being in ratchet relation with said pawl means.

6. A locking reel mechanism, comprising in combination;
a frame;
a rotatable spool;
an elongated web member having one end thereof secured to the spool and adapted to be wound up on said spool;
means movably mounting said rotatable spool onto said frame to permit migration of the spool away from a fixed position in a direction normal to the axis of rotation of the spool;
deformable retainer means bearing against the movable mounting means to maintain the said spool in its fixed position;
gear means carried by the spool and rotatable therewith;
pawl means mounted for pivotal movement and positioned in a spaced apart relationship to the gear means relative to the said fixed position of the spool and spring biased to lockingly engage the gear means in ratchet relation upon pivotal movement of the spool from its said fixed position;
said retainer means including means mounted on the frame biasing said movable spool support means for pivotal movement in one direction from its fixed normal position to maintain said pawl means in locking engagement with said gear means when the said means for movably supporting the spool is pivotally moved in said one direction from its said fixed angular position; and
a spring motor having an output operatively connected to the spool, said spring motor being so arranged with respect to the spool as to be wound up when the spool is rotated in a first direction and adapted to rotate the spool and said gear means in a rewind direction with said gear means being in a ratchet relation with said pawl means.

7. A safety harness locking device, comprising;
a housing;
a spool;
support means rotatably mounting said spool and pivotally attached to the housing;
at least one ratchet gear carried by said spool and rotatable therewith;
means carried by the housing and arranged in contact with the support means to normally maintain the support means in a fixed position relative to the housing;
at least one pawl member carried by the housing for pivotal movement and spring biased into position to lockingly engage the said ratchet gear when the spool and gear are pivotally moved in one direction from the said normal fixed position;
said contact means including means mounted on said housing biasing said support means for movement in said one direction to maintain said pawl member in locking engagement with said ratchet gear when the support means is moved from said normal position;
a spring motor having an output operatively connected to the spool, said spring motor being so arranged with respect to the spool as to be wound up when the spool is rotated in one direction and adapted to rotate the spool and said gear means in a rewind direction with said gear means being in ratchet relation with said pawl member; and
lever means movably mounted on the housing and manually operable to engage the said spool support means, said lever means adapted to move the said spool and said ratchet gear away from the position of locking engagement with the said pawl member and to return the support means to the fixed normal position relative to the housing.

8. A locking reel mechanism, comprising in combination;
a frame;
a rotatable spool;
an elongated web member having one end thereof secured to the spool and adapted to be wound up on said spool;
means movably mounting said rotatable spool onto said frame to permit migration of the spool away from a normal station in a direction normal to the axis of rotation of the spool;
deformable retainer means bearing against the movable mounting means to maintain the said spool in its normal station;

a braking member carried by the spool and rotatable therewith;

a first pawl means carried by the frame and positioned to lockingly engage the braking member upon migration of the spool in one direction away from the normal station;

a second pawl means carried by the frame and positioned to lockingly engage the braking member upon diametric migration of the spool away from the normal station; and lever means movably mounted on the frame for engagement with the spool mounting means upon actuation thereof and adapted to thereby move the spool and braking member away from their position of engagement with the first pawl means to their position of engagement with the second pawl means.

References Cited by the Examiner
UNITED STATES PATENTS

| | | |
|---|---|---|
| 350,473 | 10/1886 | Bien. |
| 2,370,921 | 3/1945 | Sharpe _____ 242—107.4 X |
| 2,708,966 | 5/1955 | Davis. |
| 3,074,761 | 1/1963 | Ryan. |
| 3,100,609 | 8/1963 | Wrighton _____ 242—107.4 |
| 3,100,669 | 8/1963 | Monroe. |
| 3,138,405 | 6/1964 | Hanway _____ 242—107.4 X |

MERVIN STEIN, *Primary Examiner.*